Aug. 30, 1938.  R. T. CORNELIUS  2,128,351
FAUCET
Filed Sept. 21, 1936
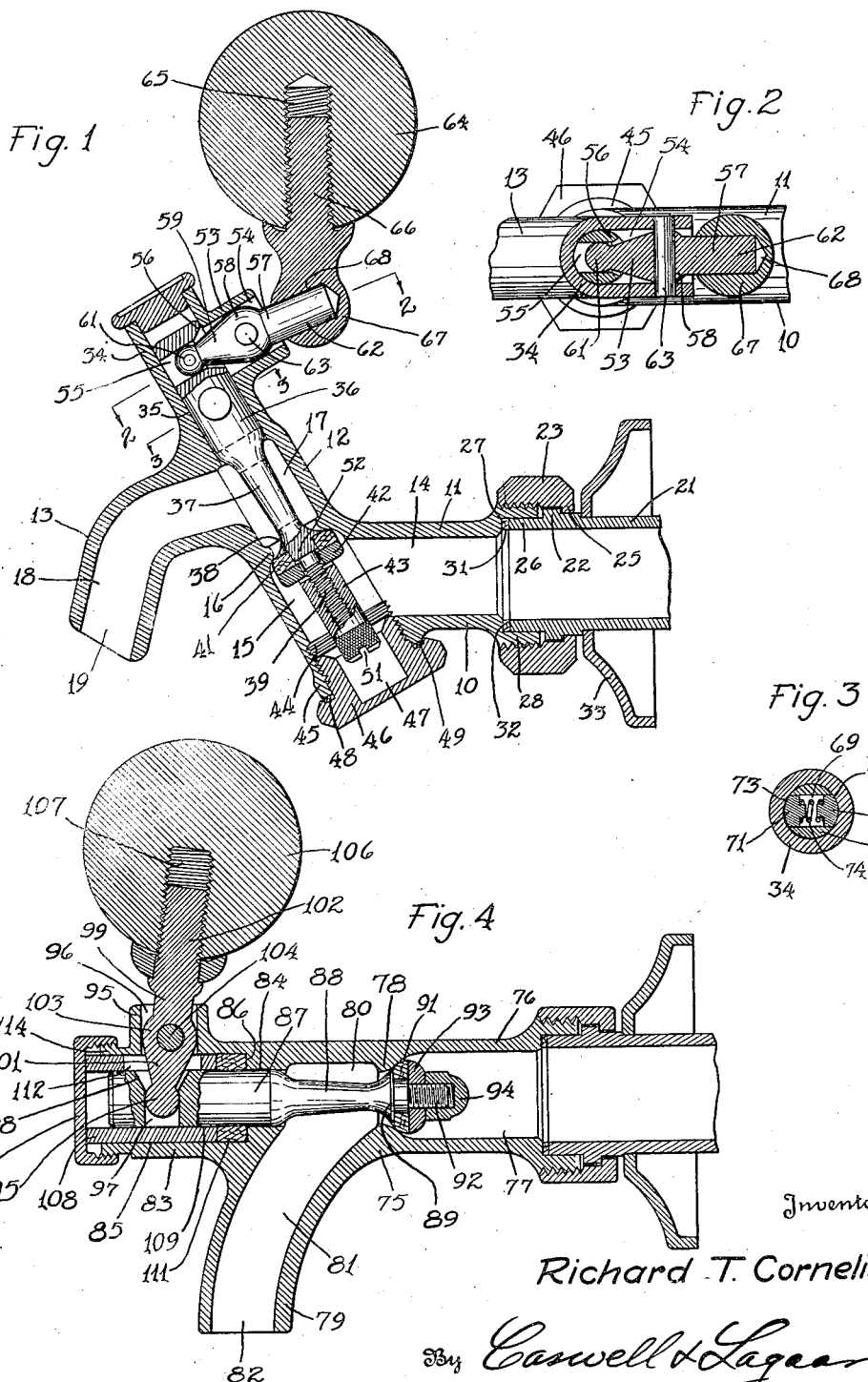
Inventor
Richard T. Cornelius
By Caswell & Lagaard
Attorney Patented Aug. 30, 1938

2,128,351

UNITED STATES PATENT OFFICE 2,128,351

FAUCET

Richard T. Cornelius, Minneapolis, Minn.

Application September 21, 1936, Serial No. 101,772

5 Claims. (Cl. 251—133)

My invention relates to faucets and has for its object to provide a faucet which will be quick in action.

Another object of the invention resides in providing a faucet which will act positively and which will remain in either open or closed position without being held.

An object of the invention resides in providing a faucet particularly adapted for the purpose of dispensing beer.

A feature of the invention resides in providing a faucet in which all of the parts, excepting the body, are constructed as screw machine products.

An object of the invention resides in providing a faucet having a body constructed with a passageway and a valve seat in said passageway, together with a guide having a bore therein concentric with said valve seat and a stem slidable along said bore and carrying a valve head adapted to engage said valve seat.

Another object of the invention resides in providing the guide with a boss extending laterally therefrom and having a hole therethrough, together with a lever extending through said hole and pivoted to said boss.

A feature of the invention resides in constructing the hole round and in providing a spherical portion on the lever snugly fitting within the hole and in further providing a pin extending through the boss and spherical portion of the lever for pivoting the same to the boss.

Another object of the invention resides in arranging said guide and the portion of the body associated therewith in an inclined position and in providing a shank connected to said lever and issuing angularly upwardly therefrom and carrying a handle for operating said lever.

A still further object of the invention resides in providing an opening in the body at the end of the inclined portion thereof opposite said guide and through which the valve stem and valve head may be inserted into the faucet body and in further providing a cap for closing said opening.

An object of the invention resides in providing an elongated threaded member for attaching the valve head to the valve stem, said member having a part disposed in proximity to said cap, whereby the valve head may be conveniently removed from the valve stem.

Another object of the invention resides in constructing the portion of the body forming the guide with an enlarged bore and in mounting within said bore a packing and a sleeve slidable therein and adapted to force the packing against said valve stem.

An object of the invention resides in constructing said sleeve with an opening through which said lever extends.

Other objects of the invention reside in the novel combination and arrangement of parts and in the details of construction hereinafter illustrated and/or described.

In the drawing:

Fig. 1 is an elevational sectional view of a faucet illustrating an embodiment of my invention.

Fig. 2 is a plan sectional view taken on line 2—2 of Fig. 1.

Fig. 3 is a cross sectional view taken on line 3—3 of Fig. 1 and showing solely the valve stem and guide.

Fig. 4 is a view similar to Fig. 1 of a modification of the invention.

My improved faucet comprises a body 10 having a horizontal portion 11 and an inclined portion 12 extending forwardly and upwardly therefrom. Intermediate the ends of the inclined portion 12 is provided a spout 13 which is directed downwardly. The body portion 11 is formed with a passageway 14 which communicates with a chamber 15 in the lower end of the body portion 12. Within the inclined portion 12 is provided a valve seat 16 which separates the valve chamber 15 from a passageway 17 in the upper end of said inclined body portion. A passageway 18 in the spout 13 communicates with the passageway 17 and discharges downwardly as indicated at 19.

For attaching the faucet to the system with which it is to be employed, a nipple 21 is utilized which is constructed near one end with a collar 22 integral therewith. A nut 23 encircles the nipple 21 and is constructed with a shoulder 25 which engages the collar 22. The end 26 of the nipple 21 is received in a socket 27 formed in the end 28 of the portion 11 of body 10. The nut 23 is adapted to screw upon the portion 28 of said body and to draw the end 26 inwardly into socket 27. A gasket 31 disposed between the end 26 of the nipple 21 and a shoulder 32 formed by socket 27 provides a fluid tight connection between the nipple 21 and the faucet proper. Nipple 21 is secured to the system in any desired manner such as is now well known in the art. When the faucet is installed on a suitable beer fixture a flange 33 may be employed which encircles the nipple 21 and is disposed adjacent to the wall or to the portion of the fixture from which the faucet issues.

Extending outwardly from the upper end of the inclined portion 12 of body 10 is a guide 34. This guide is constructed with a bore 35 in which is slidably mounted a valve stem 36. Valve stem 36 is reduced in diameter at 37 where the same passes through the passageway 17 and is constructed in proximity to the valve seat 16 with a shoulder 38. The lower end of the valve stem 36 is constructed with a threaded spindle 39. A valve head 41 encircles this spindle and is seated against the shoulder 38. This valve head is held in place by means of a washer 42 which also encircles said spindle and an elongated threaded nut 43 which screws upon said spindle and forces the washer 42 and the valve head 41 against the shoulder 38.

For the purpose of assembling the valve stem 36 and the valve head 41 in the faucet a threaded opening 44 is formed in the lowermost end 45 of portion 12 of body 10. This opening is of larger diameter than the diameter of the valve head 41 and the washer 42 so that the entire assembled device may be inserted through the same and into the chamber 15, passageway 17 and bore 35. In order to close this opening a screw cap 46 is employed which is constructed with a cavity 47 in the center of the same. A gasket 48 extending between a shoulder 49 on said cap and the edge of the end 45 of the portion 12 of body 10 forms a fluid tight closure for the opening 44. The nut 43 is constructed with a screw slot 51 at the outer end of the same which is disposed near the end 45 of the portion 12 of body 10. By means of this construction the screw slot is readily accessible and the nut 43 may be conveniently removed to free the valve head 41 and washer 42 from the stem 36 without removing the valve stem from the body 10. The valve stem 36 is held from rotation as will presently become apparent. It will be noted that the portion 52 of said valve stem on which the valve head 41 is mounted is of greater diameter than the spindle 39 so that once the valve head has been disengaged therefrom the same slides readily along said spindle and may be easily disengaged from the valve stem without removing the valve stem from the faucet.

The valve stem 36 is operated in the following manner: On the rearward side of the guide 34 and intermediate the ends thereof is provided a boss 53. This boss is constructed with a round hole 54 which extends completely through the same and communicates with the bore 35 in said guide. The valve stem 36 is similarly constructed with a round hole 55 which is countersunk at one end, as indicated at 56, and which throughout the movement of the valve stem lies substantially opposite the hole 54. For reciprocating the valve stem 36 a lever 57 is employed which is constructed at the center of the same with a spherical portion 58. This portion fits snugly within the hole 54. The lever 57 further includes an arm 59 extending through the hole 54 and into the bore 35. This arm terminates in a spherical head 61 which fits within the hole 55 in valve stem 36. The lever 57 further includes an arm 62 preferably cylindrical in form which extends outwardly from the device. Lever 57 is pivoted to the boss 53 by means of a pintle 63 which passes through the spherical portion 58 of said lever and through the boss 53. A handle 64 in the nature of a ball is used for manipulating lever 57. This handle is internally threaded as designated at 65 to receive a shank 66 which is screwed therein. Shank 66 is constructed with a spherical head 67 which is drilled with an oblique hole 68 adapted to receive the arm 62. The arm 62 may be attached to the shank 66 through a press fit or by means of a pin, or any other suitable device may be used for securing the parts together. The hole 68 is so drilled that the shank 66 extends upwardly as shown in Fig. 1, whereby the ball 64 is conveniently accessible to the user of the faucet.

In order to cause the valve to remain either open or closed a friction device is employed which is best shown in Fig. 3. Extending through the valve stem 36 is a transverse cylindrical hole 69. In this hole are mounted two friction buttons 71 and 72 which have heads 73 adapted to engage the wall of the guide 34 formed by the bore 35. These two buttons are urged outwardly by means of a compression coil spring 74 disposed between the same.

In the operation of the device, it is merely necessary to move the handle 64 toward the user. This swings the arm 62 of lever 57 upwardly and the arm 59 of said lever downwardly moving the valve head 41 downwardly and away from the valve seat 16. Fluid may then flow through the passageway 14 to chamber 15, from chamber 15 past the valve seat 16 and into chamber 17 where the fluid travels through the passageway 18 and discharges from the portion 19 of said passageway from the faucet. When the handle 64 is moved in the opposite direction, the valve head 41 is brought into engagement with valve seat 16. This closes the faucet. Leakage past the guide 34 is prevented by means of the disposition of the parts and the fit between the valve stem 36 and bore 35. If desired, however, an arrangement such as shown in Fig. 4 and to be presently described may be used.

In Fig. 4 I have shown a modification of the invention. In this form of the invention the body of the faucet has been indicated by the reference numeral 75 and comprises a horizontal portion 76 which is constructed with a passageway 77 forming the valve chamber of the invention. Intermediate the ends of the horizontal portion 76 is provided a valve seat 78 which separates the passageway 77 from another passageway 80 at the forward end of the body. A spout 79 is attached to the body 75 and has a curved passageway 81 communicating with the passageway 80 and discharging downwardly as indicated at 82. At the forward portion of the body 75 and in alignment with the portion 76 of said body is a guide 83. This guide is constructed with a bore 84 concentric with the valve seat 78. Bore 84 opens to the exterior of the forward end of the guide 83 and has an enlarged end 85. By means of this construction a shoulder 86 is provided between the two portions of the bore.

Slidably mounted in the bore 84 is a valve stem 87 which is similar to the valve stem 36. This valve stem is reduced in diameter at 88 where the same extends through passageway 77. In proximity to the valve seat 78 the valve stem is constructed with a shoulder 89 against which a valve seat 91 is urged. At the extreme end of the valve stem 87 is provided a spindle 92 which is reduced in diameter and threaded. Upon this portion of the stem is mounted a washer 93 which is urged against the valve head 91 by means of a nut 94 screwed upon the spindle 92.

The body 76 may be attached to the system with which the faucet is used in exactly the same manner as the faucet shown in Fig. 1. Such construction forming no particular feature of the invention, the description thereof will not be repeated and similar reference numerals will be used to designate the corresponding parts thereof.

On the upper portion of the guide 83 and intermediate the ends thereof is provided a boss 95 which extends upwardly therefrom. This boss is constructed with a round hole 96 which extends through the same and communicates with the enlarged end 85 of bore 84. The valve stem 87 is similarly constructed with a round hole 97 which is smaller in diameter than the hole 96 and which is countersunk as designated at 98. This hole is so disposed that the same is substantially opposite the hole 86 throughout the movement of the valve stem.

For operating the valve stem 87, a lever 99 is employed which is constructed with an arm 101 extending through the hole 96 and into the end 85 of the bore 84. Said lever is further constructed with a shank 102 which serves as the other arm of the lever and which projects outwardly beyond the device. Intermediate the ends of the lever the same is provided with a spherical portion 103 similar to the spherical portion 58 of lever 57 which fits snugly within the hole 96 in boss 95. A pin 104 passes through the spherical portion 103 of said lever and the boss 95 and serves to pivot said lever for swinging movement with reference thereto. At the end of arm 101 of lever 99 is provided a spherical head 105 which fits within the hole 97 in valve stem 87. This spherical head both swings and slides with reference to the hole 97 and operates to reciprocate the valve stem 87 within the bore 84 of guide 83 as the lever is moved to and fro. A handle 106 which is constructed as a ball has a threaded hole 107 into which the shank 102 of lever 99 is screwed.

Within the enlarged end 85 of bore 84 is disposed a sleeve 108. This sleeve is constructed with a bore 109 of the same diameter as the bore 84 which further serves to assist in guiding the valve stem 87. Encircling said valve stem 87 and disposed within the enlarged end 85 of bore 84 and between the end of the sleeve 108 and shoulder 86 is a packing ring 111 which is adapted to be urged into engagement with the valve stem 87 and to effect a fluid tight connection between said valve stem and body 75. The sleeve 108 has a large hole 112 in it through which the arm 101 of lever 99 extends. This hole is of such dimensions so that the sleeve may be moved throughout its range of movement without affecting the operation of said lever. The outer end of the sleeve 108 is engaged by means of a screw cap 113 which is screwed upon the threaded end 114 of the guide 83. As the cap 113 is screwed up, sleeve 108 is urged inwardly and against the packing ring 111 which procures a tight joint between the valve stem 87 and the valve body 75.

The operation of this form of the invention is similar to the operation of that shown in Fig. 1. Upon movement of the handle 106 forwardly, the arm 101 of lever 99 swings rearwardly and the valve head 91 is disengaged from the seat 78. The friction created by the packing ring 111 holds the valve in open position. Fluid flows from the passageway 77 past the valve seat 78 into the passageway 80 and from said passageway through the passageway 81 of the spout 79 leaving the said spout from the portion 82 of the passageway therein. When the handle 106 is moved in the opposite direction, valve seat 91 is brought into engagement with the valve seat 78. The pressure of the fluid within the passageway 77 aided by the friction created by packing ring 111 holds the valve head in closing position.

The advantages of my invention are manifest. The faucet is extremely positive in action. Only a small amount of movement is necessary to move the valve head from closing to open position and vice versa, thereby making the faucet extremely quickly acting. The valve stem and valve head are both positively moved to either opening or closing position so that reliance upon springs or other resilient means for effecting closing of the faucet is unnecessary. The handle and operating lever for the faucet are so arranged that in the event that the same are accidentally engaged by the user the faucet will be closed and will not be unintentionally opened. By means of the particular construction employed, all of the parts excepting the body can be made on a screw machine so that little expense is involved and the faucet can be constructed at a nominal cost. The parts of the invention are so arranged that leakage of fluid past the valve stem will not readily occur. In one form of the invention, the valve head is readily removable and can be replaced without removing the valve stem. The packing ring forming the seal between the valve stem and valve body also function to provide suitable friction for holding the valve head in its extreme positions.

Changes in the specific form of my invention, as herein disclosed, may be made within the scope of what is claimed without departing from the spirit of my invention.

Having described my invention, what I claim as new and desire to protect by Letters Patent is:

1. A faucet comprising a body having a passageway therethrough, a valve seat in said passageway, a guide having a bore therein concentric with said valve seat, a valve stem slidable along said bore, a valve head on said valve stem adapted to engage said valve seat, said bore opening to the exterior at one end and being enlarged at such end to form a shoulder, a packing encircling said valve stem and seated against said shoulder, a sleeve within said enlarged portion of the bore and engaging the packing, said sleeve assisting in guiding said stem for sliding movement, means for sliding said sleeve toward said packing and valve operating means extending through said guide and through said sleeve for sliding said valve stem along said guide.

2. A faucet comprising a body having a passageway therethrough, a valve seat in said passageway, a guide having a bore therein concentric with said valve seat, a valve stem slidable along said bore, a valve head on said valve stem adapted to engage said valve seat, said bore opening to the exterior at one end and being enlarged at such end to form a shoulder, a packing encircling said valve stem and seated against said shoulder, a sleeve within said enlarged portion of the bore and engaging the packing, said sleeve assisting in guiding said stem for sliding movement, said sleeve having a transverse hole therethrough, a boss extending laterally from one side of said guide and constructed with a hole therethrough communicating with said bore, a lever extending through the hole in said boss, and having an arm extending through said hole in the sleeve, means for pivotally and slidably connecting said stem with said arm, a handle attached to said lever and means for urging said sleeve against said packing.

3. A faucet comprising a body having a passageway therethrough, a valve seat in said passageway, a guide having a bore therein concentric with said valve seat, a valve stem slidable along said bore, a valve head on said valve stem adapted to engage said valve seat, said bore opening to the exterior at one end and being enlarged at such end to form a shoulder, a packing encircling said valve stem and seated against said shoulder, a sleeve within said enlarged portion of the bore and engaging the packing, said sleeve assisting in guiding said stem for sliding movement, said sleeve having a transverse hole therethrough, a boss extending laterally from one side of said guide and constructed with a hole therethrough communicating with said bore, a lever extending through said hole, and having an arm extending through said hole in the sleeve, means for pivotally and slidably connecting said stem with said arm and a cap screwed upon the end of said guide and engaging the end of said sleeve, said cap urging said sleeve against said packing.

4. A faucet comprising a body having a passageway therethrough, a valve seat in said passageway, a guide having a bore therein concentric with said valve seat, a valve stem slidable along said bore, a valve head on said valve stem adapted to engage said valve seat, said bore opening to the exterior at one end, a shoulder within said bore, said valve stem being spaced from said bore outwardly of said shoulder, a packing encircling said valve stem and seated against said shoulder, a sleeve within said bore and engaging the packing, said sleeve assisting in guiding said stem for sliding movement, means for sliding said sleeve toward said packing and valve operating means extending through said guide and through said sleeve for sliding said valve stem along said guide.

5. A faucet comprising a body having a passageway therethrough, a valve seat in said passageway, a guide having a bore therein concentric with said valve seat, a valve stem slidable along said bore, a valve head on said valve stem adapted to engage said valve seat, said bore opening to the exterior at one end, a packing encircling said valve stem and disposed within said bore, a sleeve disposed within said bore and engaging said packing, said sleeve being guided for sliding movement within said bore to compress said packing, valve operating means extending through said guide and through said sleeve for sliding said valve stem along said guide and valve operating means operable from the exterior of said faucet body for moving said sleeve to compress said packing.

RICHARD T. CORNELIUS.